(12) United States Patent
Bellingham et al.

(10) Patent No.: US 10,610,773 B2
(45) Date of Patent: Apr. 7, 2020

(54) INTERACTIVE DIGITAL PLATFORM DEVICE AND METHOD

(71) Applicant: SUFFUSE INC., Cobourg (CA)

(72) Inventors: Thomas C. Bellingham, Hamilton (CA); Shawn A. Willings, Orono (CA); John C. Cappelletti, Castleton (CA)

(73) Assignee: SUFFUSE INC., Ontario (CA)

( * ) Notice: Subject to any disclaimer, the term of this patent is extended or adjusted under 35 U.S.C. 154(b) by 212 days.

(21) Appl. No.: 15/911,396

(22) Filed: Mar. 5, 2018

(65) Prior Publication Data

US 2018/0250586 A1 Sep. 6, 2018

Related U.S. Application Data

(60) Provisional application No. 62/467,382, filed on Mar. 6, 2017.

(51) Int. Cl.
*A63F 13/214* (2014.01)
*A63F 13/2145* (2014.01)
(Continued)

(52) U.S. Cl.
CPC .......... *A63F 13/214* (2014.09); *A63F 13/211* (2014.09); *A63F 13/212* (2014.09); *A63F 13/2145* (2014.09); *A63F 13/235* (2014.09); *A63F 13/285* (2014.09); *A63F 13/31* (2014.09); *A63F 13/42* (2014.09); *A63F 13/5255* (2014.09); *G06F 3/042* (2013.01); *G06K 7/10297* (2013.01); *G06K 7/10336* (2013.01); *G06K 7/10356* (2013.01); *G06K 7/10475* (2013.01); *H01Q 1/2225* (2013.01); *H01Q 7/00* (2013.01); *H01Q 21/0025* (2013.01); *H04B 5/0081* (2013.01); *A63F 13/822* (2014.09); *A63F 2300/8082* (2013.01);
(Continued)

(58) Field of Classification Search
CPC .... A63F 13/214; A63F 13/211; A63F 13/212; A63F 13/2145; A63F 13/235; A63F 13/285; A63F 13/31; A63F 13/42
See application file for complete search history.

(56) References Cited

U.S. PATENT DOCUMENTS 4,337,948 A * 7/1982 Breslow .............. A63F 3/00643
273/237
5,691,885 A * 11/1997 Ward .................... G06F 15/803
361/729

(Continued)

*Primary Examiner* — David L Lewis
*Assistant Examiner* — Matthew D Hoel
(74) *Attorney, Agent, or Firm* — Birch, Stewart, Kolasch & Birch, LLP

(57) ABSTRACT

A scalable, portable platform for allowing digital interaction between physical objects and digital content in virtual or augmented reality applications is provided. The board comprises a base; an array of near field communication (NFC) antennas positioned at fixed locations within the base; a plurality of light sources, each light source centered within the antenna coil of a corresponding one of the NFC antennas; a plurality of magnets positioned on outer edges of the base such that multiple based can be connected together; and one or more processors configured to wirelessly transmit and receive messages to and from an external device, control the plurality of light sources, and detect and position objects placed on the base in a virtual space.

7 Claims, 6 Drawing Sheets

(51) Int. Cl.

| | | |
|---|---|---|
| *A63F 13/235* | (2014.01) | |
| *A63F 13/285* | (2014.01) | |
| *A63F 13/31* | (2014.01) | |
| *A63F 13/42* | (2014.01) | |
| *G06F 3/042* | (2006.01) | |
| *G06K 7/10* | (2006.01) | |
| *H01Q 1/22* | (2006.01) | |
| *H01Q 21/06* | (2006.01) | |
| *H01Q 7/00* | (2006.01) | |
| *A63F 13/211* | (2014.01) | |
| *H01Q 21/00* | (2006.01) | |
| *A63F 13/5255* | (2014.01) | |
| *A63F 13/212* | (2014.01) | |
| *H04B 5/00* | (2006.01) | |
| *A63H 3/50* | (2006.01) | |
| *A63F 13/822* | (2014.01) | |

(52) U.S. Cl.
CPC ...... *A63H 3/50* (2013.01); *G06F 2203/04106* (2013.01); *H01Q 21/061* (2013.01)

(56) References Cited

U.S. PATENT DOCUMENTS

| | | | | |
|---|---|---|---|---|
| 5,702,305 | A * | 12/1997 | Norman | A63F 9/24 463/42 |
| 6,165,068 | A * | 12/2000 | Sonoda | A63F 13/12 463/8 |
| 6,287,200 | B1 * | 9/2001 | Sharma | A63F 13/12 463/40 |
| 6,443,796 | B1 * | 9/2002 | Shackelford | A63H 33/042 273/237 |
| 6,524,189 | B1 * | 2/2003 | Rautila | A63F 13/12 463/40 |
| 6,540,606 | B1 * | 4/2003 | Matsukata | A63F 13/10 463/1 |
| 6,674,995 | B1 * | 1/2004 | Meyers | A63F 13/12 455/41.2 |
| 6,687,128 | B2 * | 2/2004 | Tokuhara | G06F 1/181 361/679.4 |
| 6,795,318 | B2 * | 9/2004 | Haas | H04M 1/0254 361/728 |
| 7,184,718 | B2 * | 2/2007 | Newman | G06F 1/1615 455/556.1 |
| 7,371,177 | B2 * | 5/2008 | Ellis | G06N 3/004 345/473 |
| 8,602,833 | B2 * | 12/2013 | Binder | A63F 9/1011 446/124 |
| 8,951,088 | B2 * | 2/2015 | Binder | A63F 9/1011 446/124 |
| 9,356,383 | B2 * | 5/2016 | Waffenschmidt | H01R 13/514 |
| 9,419,378 | B2 * | 8/2016 | Bdeir | H01R 13/6205 |
| 9,559,519 | B2 * | 1/2017 | Binder | A63H 33/042 |
| 9,567,607 | B2 * | 2/2017 | Wilson | C07K 14/005 |
| 9,583,940 | B2 * | 2/2017 | Binder | H04L 12/2803 |
| 9,923,606 | B2 * | 3/2018 | Shimomura | A63F 13/34 |
| 10,155,153 | B2 * | 12/2018 | Binder | A63F 9/1011 |
| 10,164,687 | B2 * | 12/2018 | Jang | G06F 21/44 |
| 2002/0006825 | A1 * | 1/2002 | Suzuki | A63F 13/12 463/40 |
| 2002/0175862 | A1 * | 11/2002 | Hunter | H01Q 21/24 343/700 MS |
| 2013/0084801 | A1 * | 4/2013 | Royston | G06K 7/015 455/41.1 |
| 2016/0087692 | A1 * | 3/2016 | Shimomura | A63F 13/34 340/10.1 |
| 2016/0310832 | A1 * | 10/2016 | Dandamudi | A63F 13/00 |
| 2019/0341674 | A1 * | 11/2019 | Rosenthal | H04W 4/80 |

* cited by examiner

INTERACTIVE DIGITAL PLATFORM DEVICE AND METHOD

The present application relates to platforms that provide interaction between physical objects and digital content, and specifically to a board which acts as a conduit to make physical objects, including toys and/or collectables, become digitally interactive.

BACKGROUND

Interaction between physical objects and digital content has historically been implemented in systems which allow physical objects, e.g., figurines, toys, action figures, etc., to interact within a game and are commonly referred to as toy-to-life systems. Existing toy-to-life systems include a peripheral device, also referred to as a portal, tethered to a gaming system hub that transfers a physical toy, figurine, and/or action figure into a virtual game by identifying the physical object and in some cases acquiring previous game data stored within the physical object.

Since the inception of the Toys to Life market there has been very little change in the technology. Currently the technology allows for the unlocking of digital characters within a game by placing an NFC enabled toy on a portal. The portal reads the details of the toy and presents a digital representation of that toy within a game. The Player then plays the game forgetting about the toy.

Although the existing portals allow consumers/users to transport their physical characters into a virtual world, e.g., a video game, and play with them, they have several drawbacks. These portals generally only allow up to three figures to be identified and/or transported into game play at a time. They are proprietary devices, thereby preventing third party games from interacting with the portal. Also, they need to be tethered to a specific gaming system to work and thus are not portable.

Therefore, a need exists for an independent device/board which allows interaction between physical and digital content which is both scalable and portable.

SUMMARY

This disclosure describes a scalable, portable device/board which acts as a conduit for physical objects becoming digitally interactive in a variety of ways and a method for detecting multiple tags using NFC and their spatial relation to one another.

In general, one aspect of the subject matter described herein can be embodied in a scalable, portable board for allowing digital interaction between physical objects and digital content in virtual or augmented reality applications. The board comprises a base; an array of near field communication (NFC) antennas positioned at fixed locations within the base; a plurality of light sources, each light source centered within the antenna coil of a corresponding one of the NFC antennas; a plurality of magnets positioned on outer edges of the base such that multiple based can be connected together; and one or more processors configured to wirelessly transmit and receive messages to and from an external device, control the plurality of light sources, and detect and position objects placed on the base in a virtual space.

The above and other embodiments can optionally include one or more of the following features. The one or more processors may be further configured to read and write information from an object placed on the base. Multiple board can be connected together using magnets to create a larger platform. The connected boards can communicate with each other using infrared technology. Alternatively, the boards may communicate using direct pin connections which allow transmission of both power and data. This allows multiple interconnected boards to be simultaneously charged by connecting a single one of the interconnected boards to a power source. The boards can be connected into different geometric shapes. The board may include a plurality of electromagnets, each electromagnet centered within the antenna coil of a corresponding one of the NFC antennas. The board may include an eccentric rotating mass (ERM) motor to providing haptic feedback. In some embodiments the plurality of light sources may include, a center light sources, such as an LED, and three additional light sources for each NFC antenna, the three additional light sources for each antenna being three NeoPixel rings each having a different diameter. The surrounding light sources can be used to convey additional information about the digital characters corresponding to the objects on the board.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

Figure 1:
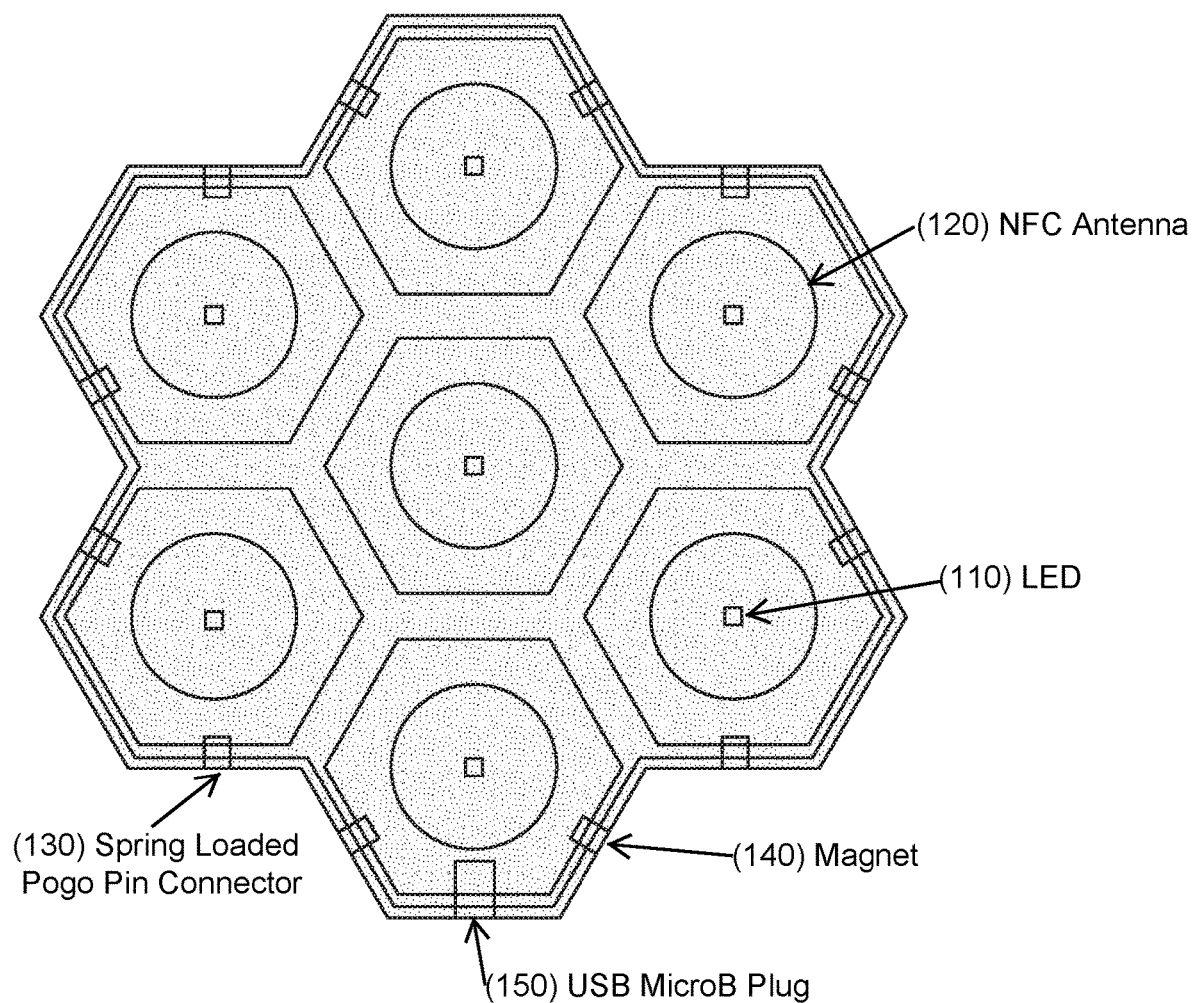
FIG. 1 is a schematic layout of a scalable board according to an embodiment.
Figure 1:
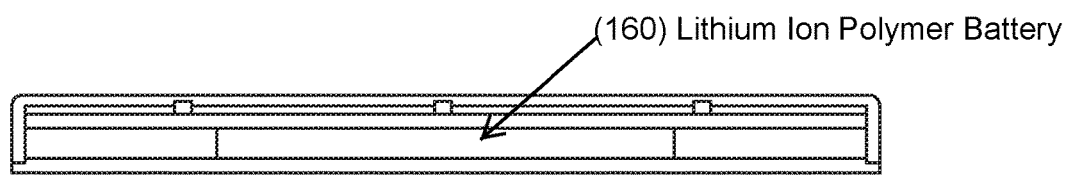
Figure 4:
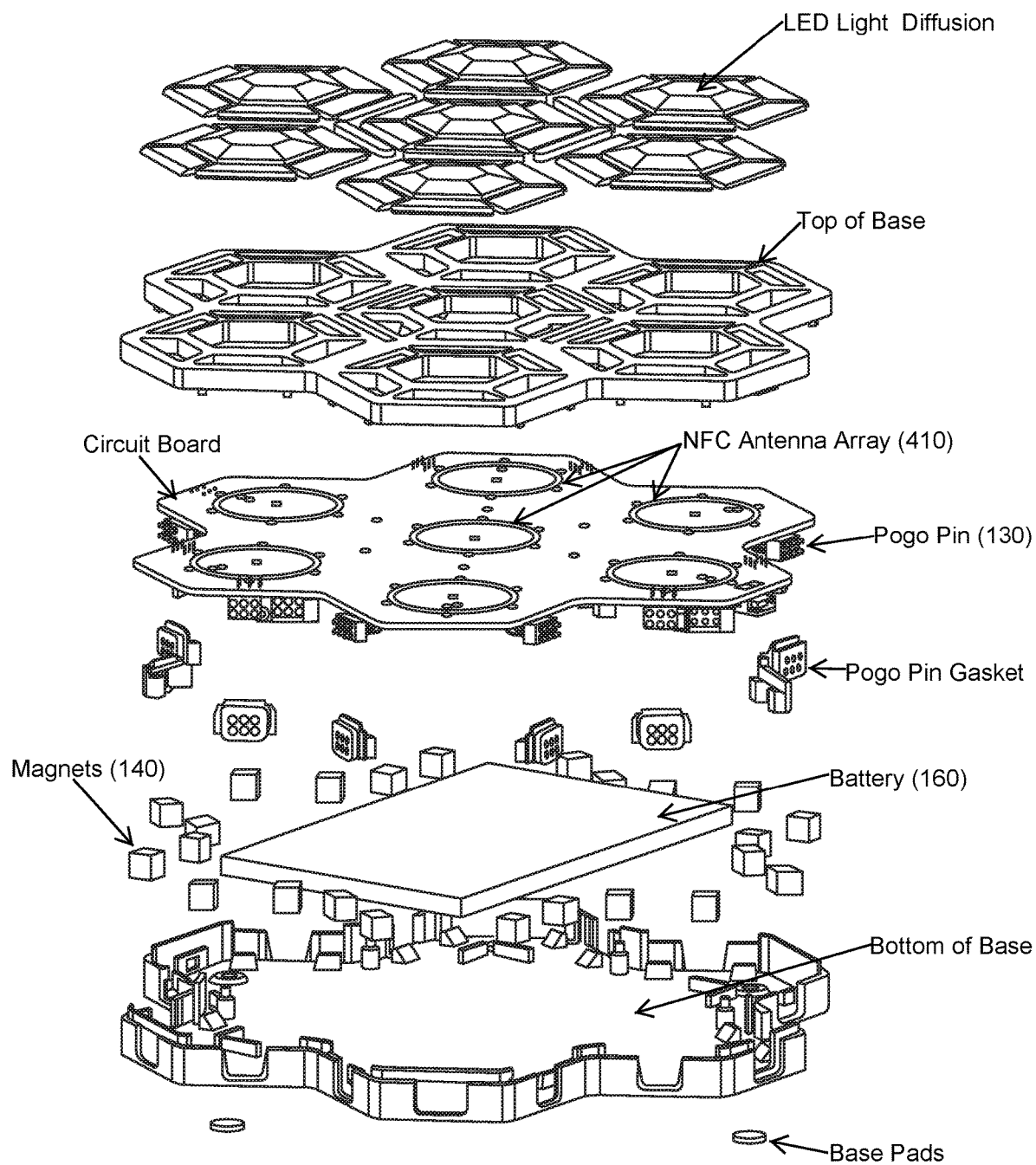
FIG. 4 is an exploded view of a scalable board according to an embodiment.

FIG. 1 provides a schematic layout of a scalable board according to an embodiment. The board includes a base 100; an array of near field communication (NFC) antennas (120); a plurality of light sources (110), one located near each NFC antenna; a plurality of pogo pins (130); a plurality of electromagnets (140); USB connection (150); and a rechargeable battery (160). FIG. 4 provides an exploded view of the various layers/elements of the scalable board schematically shown in FIG. 1.

The NFC antenna array (410) is made up of 7 NFC antenna coils positioned at fixed locations to detect objects placed on the base. Although 7 NFC antenna coils are described herein, any number of coils greater than 2 may be used. The board also includes one or more processors, not shown, configure to wirelessly transmit and receive messages to and from an external device; control the plurality of light sources; and detect and position objects placed on the base using the NFC antenna array. The board shown is FIG. 1 has a hexagonal shape, however any number of board and/or tile shapes could be used, such a square tiles based on the desired application.

Using the NFC array, the board may recognize multiple objects, e.g., toys, figures, and/or collectables, placed on the board at the same time. The board processors may also read and write information from an object placed on the board which allows for serialization, storing of character/Player data or other small bits of information. According to an embodiment, the light source positioned near each NFC antenna is a multi-colored LED positioned in the center of the NFC antenna coil. These LEDs may be used to enhance interaction between a user and the physical objects. The board may use Bluetooth communication to relay information from the board to an external device, such as a mobile device, gaming console or other Bluetooth enabled device to allow for the interactivity of physical objects placed on the board within a digital game or application.

Because the board is platform independent, any number of third parties can design games and/or applications which interact with the board. In addition, by taking advantage of the on board LED lights applications may be designed with or without the use of a screen allowing for multiple uses and/or implementations beyond that of just unlocking and swapping characters within a game and/or application.

Figure 2:
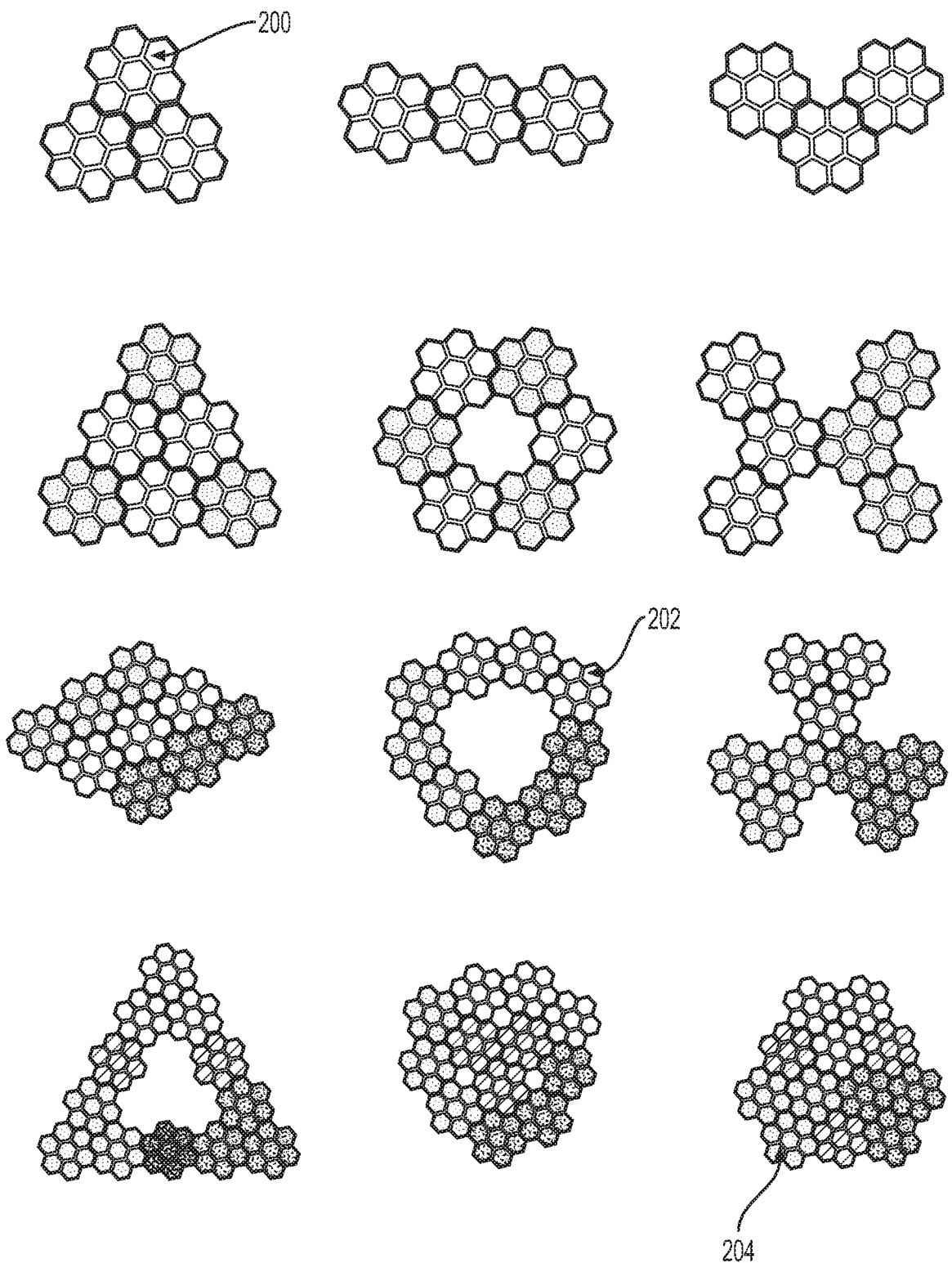
FIG. 2 illustrates example patterns when multiple board are connected together.

The board surface can be scaled by connecting a series of individual boards to create various surface patterns and/or sizes. Individual boards can be connected in a number of different patterns to increase the area of the playing surface, the number of physical objects that can be used at any given time, and/or alter the interaction between objects. Each board is outfitted with multiple pogo pins that allow for the boards to communicate to each other and be assembled in any orientation. FIG. 2 illustrates a variety of different sample orientations/patterns (200) in which individual boards may be connected, however, interconnection of multiple boards is not limited to the sample orientations/patterns shown.

The board wirelessly communicates with external devices using a wirelessly transmitter/receiver, for example, a HM-10 Bluetooth chip. The Bluetooth chip is one of the most flexible solutions as a considerable amount of devices has the protocol built in and it doesn't require any third party hardware such as a router. Alternatively and/or in addition, board to external device communication may be performed using WiFi and/or USB.

Individual boards can be connected using one or more of a plurality of connectors positioned on the edge of the board thus expanding the number of NFC antennas that can be accessed. As shown in the FIGS. 1 and 4, the plurality of connectors can be magnets provided to predefined positions on the board edge, which magnetically link multiple boards together to form various layouts or geometric shapes. Once an application, for example, a game, is launched on an external device the connected/linked boards transmit the layout information to the device using a wireless protocol, for example, Bluetooth. Each board will be assigned a color pattern of LEDs that surround the center antenna of each board. This pattern becomes the tracking target used for the AR/VR mixed reality capabilities. For example, as physically objects, e.g., game pieces, are placed on the boards, the application/game will recognize it's placement on the board and represent that placement in relativity to all the other pieces placed on the boards. As pieces are moved from one tile (antenna) to another the app is updated to represent the new positions. From here the game determines the types of interactivity and play pattern for the Player.

The boards may be connected to each other using Self Connecting Magnetic Connectors allowing for easy assembly/disassembly of multiple boards while minimizing breakage. In addition, the connected boards may communicate with each other via direct connections using pogo pins. In alternative embodiments, the board may communicate with each other via infrared (IR) technology, Bluetooth, and/or direct USB connections.

The board is also Augmented Reality (AR)/Virtual Reality (VR) capable. This is achieved through an LED target made up of 6 elements surrounding the center antenna on the board. Each element can be uniquely lit with 1 of 3 colors where all the elements make up the target. This target enables games to be viewed in a mixed reality environment, AR or VR, using a camera, bringing the digital content right to the board itself. By overlaying digital elements over top of the physical objects that are placed on the board, the player/user can see digitally enhanced elements through a viewing device, such as a mobile phone, tablet, and/or headset, in either 3D (using a headset such as GearVR, Google Cardboard, HTC Vive, etc.) or in 2D by just holding up the device and looking through the screen as if it were a magic window.

Figure 3A:
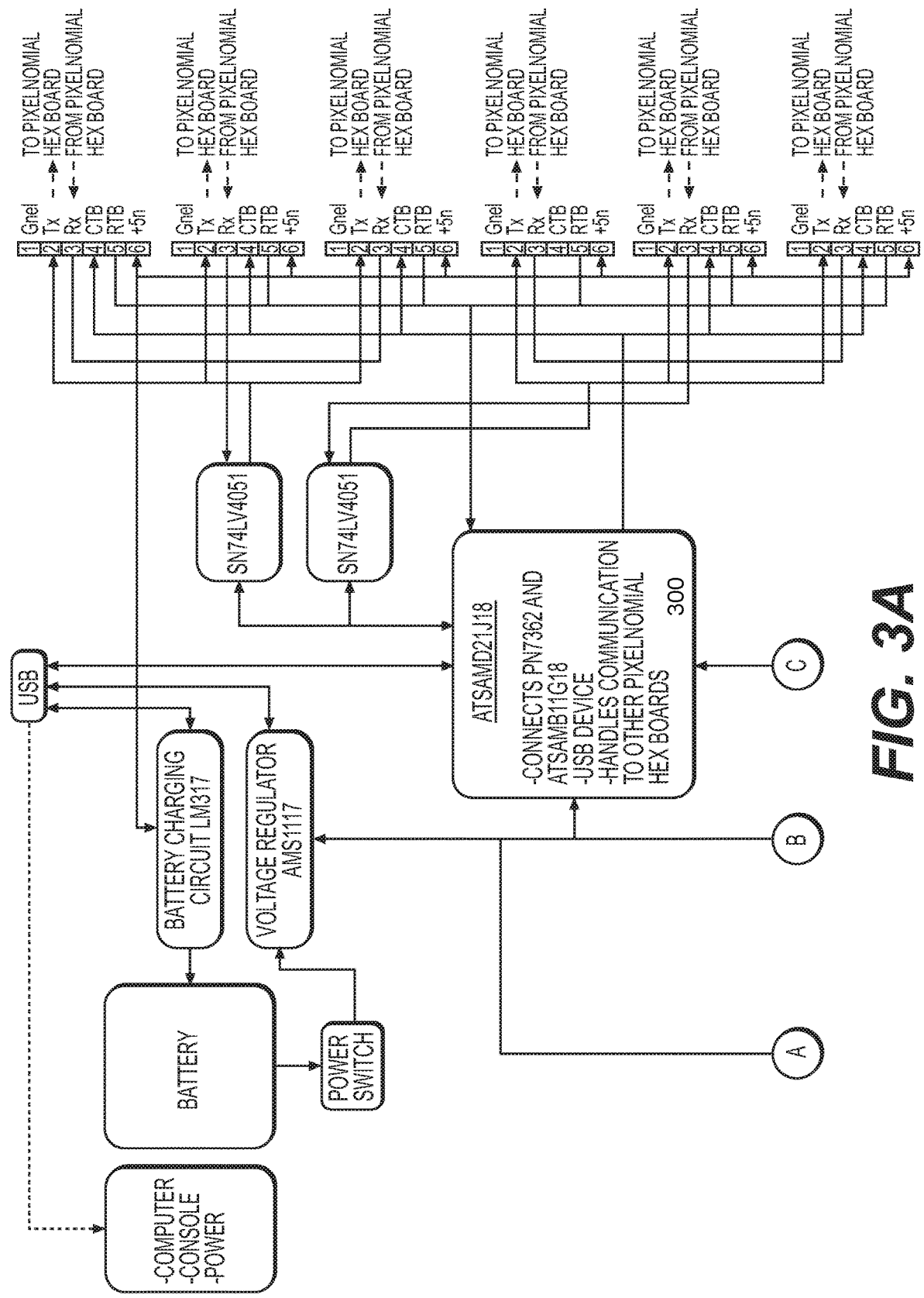
FIGS. 3A & 3B illustrate a block diagram of a scalable board according to an embodiment.
Figure 3B:
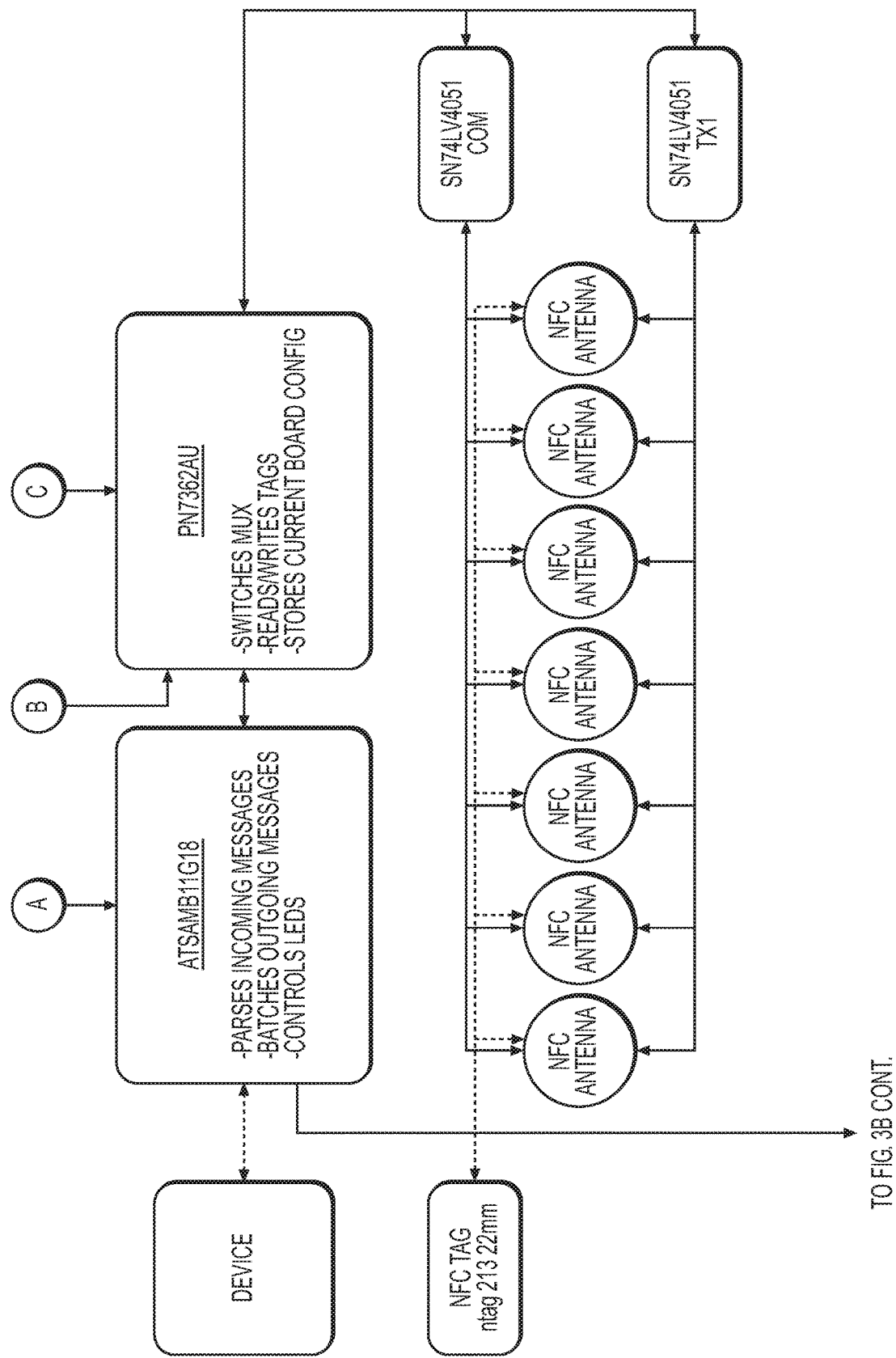
Figure 3B:
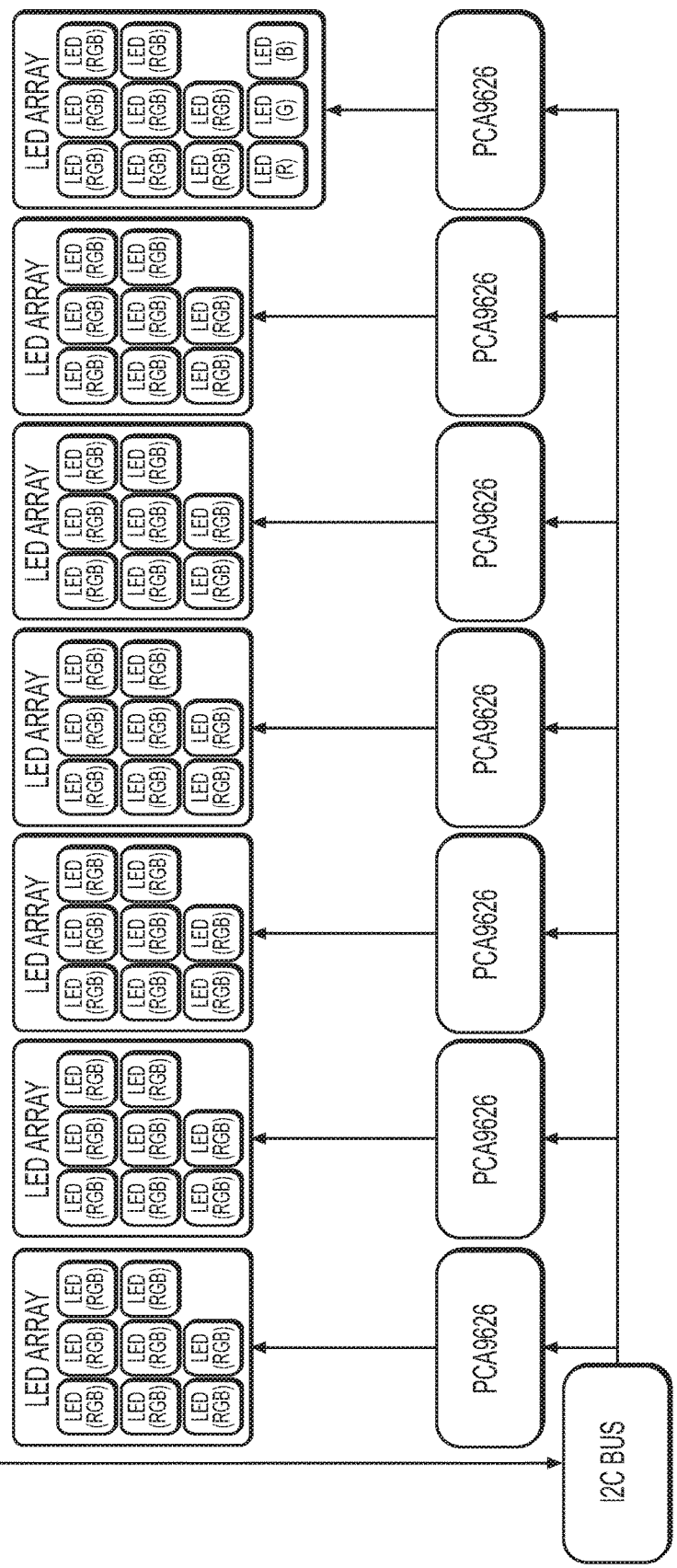

FIGS. 3A and 3B illustrate a block diagram of the internal circuitry of the board. This internal circuitry includes a plurality of processors configured to perform various functionality. For example the internal circuitry allows the board to detect multiple tags and their spatial relationship to one another, and communicate this information to an external device, for example, computer, mobile device, server or game console system, resulting in the expansion of the "Toys to Life" market.

One of the advantages of the board is that it is platform independent and thereby open to third party developers, studios, brands, franchises to license for use with their own properties. This is achieved by an SDK that assists third party developers in building digital experiences for their products that can communicate through the board. These allow each application associated with the platform to be quite different from another.

Experiences can range from what is currently in the market now, such as placing an NFC enabled toy on the board which reveals a digital version of that character within a game on a device, where the Player then plays a videogame with that character to many boards placed together to form a board not dissimilar to a chess board. Objects/pieces are then placed on the board and moved similar to moves in chess; however, the pieces are also represented digitally with the device. When 2 pieces are in contention for a square, a digitally interactive game could pop up where by Players have to battle each other for the ownership of the square. The experience may also be a simple repeating pattern game that requires the Player to follow a sequence of LEDs and repeat it by touching each of the lit antennas in the same order with an NFC enable property. These are just a few uses for the board.

Another advantage of the board is that the NFC antenna array allows for spatial recognition between each antenna. This means that through an application or game the positions of each object placed on the board can be determined. For example, each antenna may be given an identifier such its relationship to all the other antenna is known, and/or may be mapped out to define the board configuration when multiple boards are interconnected. The board also solves the problems associated with sorting and organizing multiple platforms that are joined, in a useful way that allows for a myriad of board layouts while still maintaining communication and usability with other hardware and software and AR/VR capabilities. Furthermore, in some applications the board layout may be changed in real time thereby allowing board movement to part of the board application or game play.

Not only does the board unlock the digital versions of objects, for example, a character or action figure, but it can determine where they are positioned relative to other NFC enabled objects placed on the boards. This in combination with the ability to connect together multiple boards allows variations of different implementation, such as, tabletop board games, to be created, modified or enhanced with digital components that can be experienced in mixed reality environments. Experiences can be developed without the need for screen based play where all action can be taken on the board itself relying on other elements on the board such as LED's and potentially electromagnets to produce unforeseen play patterns.

According to another embodiment, the base may be broken up into individual tiles which when connected form NFC arrays of any size and orientation. In this embodiment, each tile functions as its own independent portal with the ability to digitize a single object or be connected physically to other tiles to allow for an almost unlimited play space. The connected tile may alternative continue to function as independent tiles but communicate with other connected tiles wirelessly, for example, using WiFi, for multiplayer experiences over the web.

In an alternative embodiment, the top of the board may be a digitally interactive screen, similar to current mobile devices, allowing for a greater level of interactivity between user, object and application. In this embodiment the board is effectively a customized tablet that can be linked together creating a screen of any size. This embodiment may also allow for touch input, downloading of applications directly to the board, communication with other users through text and voice, and a level of flexibility regarding animations and other game related feedback on the board itself.

The board detects a hit when an NFC enabled object comes into contact with a tile (antenna). Additional methods of hit detection in collaboration with NFC may include: a touch sensitive screen; spring loaded buttons; light sensitive switches; and rumble effects.

Another addition to the board that could enhance the experience could be an Eccentric Rotating Mass (ERM) Vibration Motor. During gameplay this would add a physical dimension to the board gaming experience adding earthquake like effects that affect your game pieces.

Because the board is platform independent and scalable, games can be developed to allow for multiplayer functionality whereby players in different locations each have their own boards but would share in the same properties as if the players were using the same board. Additionally boards could remain independent of each other doubling the number of tiles that can be used in a game.

Although particular embodiments of the subject matter have been described, other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A scalable, portable platform for allowing digital interaction between physical objects and digital content in virtual or augmented reality applications, the platform comprising:
   a base;
   an array of near field communication (NFC) antennas positioned at fixed locations within the base;
   a plurality of light sources, each light source centered within the antenna coil of a corresponding one of the NFC antennas;
   a plurality of connectors positioned on the base such that multiple bases can be connected together; and
   one or more processors configured to
     wirelessly transmit and receive messages to and from an external device;
     control the plurality of light sources; and
     detect and position objects placed on the base in a virtual space.

2. The platform of claim 1, wherein the one or more processors are further configured to read and write information from a physical object placed on the base.

3. The platform of claim 1, wherein the plurality of connectors are magnets positions on outer edges of the base such that multiple bases can be linked to together to form a larger platform.

4. The platform of claim 3, wherein the linked bases communicate with each other using pogo pins or infrared technology.

5. The platform of claim 3, wherein the linked bases can form different geometric shapes.

6. The platform of claim 1, further comprising a plurality electromagnets, each electromagnet centered within the antenna coil of a corresponding one of the NFC antennas.

7. The platform of claim 1, further comprising an eccentric rotating mass (ERM) motor.

* * * * *